United States Patent [19]
Chan

[11] Patent Number: 5,827,594
[45] Date of Patent: Oct. 27, 1998

[54] STACKABLE WINDING CORES FOR MAGNETIC TAPES

[75] Inventor: Ping-Sing Chan, Aberdeen, Hong Kong

[73] Assignee: Acme Magnetic Tapes Ltd., Hong Kong

[21] Appl. No.: 774,719

[22] Filed: Jan. 3, 1997

[51] Int. Cl.$^6$ .................................................. B65H 75/18
[52] U.S. Cl. ........................ 428/66.6; 242/605; 206/394
[58] Field of Search .......................... 428/66.6; 242/605, 242/606; 206/509, 394

[56] References Cited

U.S. PATENT DOCUMENTS

| | | | |
|---|---|---|---|
| 4,280,670 | 7/1981 | Schor | 242/605 |
| 4,340,188 | 7/1982 | Derendorf et al. | 242/605 |
| 5,004,175 | 4/1991 | Lee | 242/605 |
| 5,441,216 | 8/1995 | Shiba | 242/605 |

Primary Examiner—Alexander Thomas
Attorney, Agent, or Firm—Burns, Doane, Swecker, & Mathis, LLP

[57] ABSTRACT

An improved rigid winding core for flexible tapes achieving improved interlocking between adjacently stacked cores by a first interlocking mechanism located on the inner rim and a second, additional, mechanism located on the planar surfaces. The first mechanism comprises a number of clamping teeth each of which comprises a first radial extending portion and a second axial extending portion. The clamping teeth is trapped in position by a retention gap formed on the inner rim. The second mechanism comprises a number of complementary lug and recess pairs which are distributed on the core planes. This improved core discloses a winding core with improved interlocking while at the same time provides considerable material saving comparing to conventional designs.

4 Claims, 4 Drawing Sheets

C - C'

B - B'

D - D'

STACKABLE WINDING CORES FOR MAGNETIC TAPES

FIELD OF THE INVENTION

The present invention relates to a stackable winding core. In particular, it relates to a winding core for carrying a length of flexible tapes coated with a recording medium. More particularly, it relates to winding cores for carrying a large diameter of magnetic tapes which can be compactly stacked together for secured and efficient transportation.

BACKGROUND OF THE INVENTION

Recording tapes are usually manufactured by carefully coating a magnetic recording material on a flexible plastic sheet and then by cutting the coated sheet into tapes of a pre-determined standard width at the tape factory. After lengths of blank audio, video or other magnetic tapes have been obtained from the coated magnetic sheets, they are usually wound on winding cores each carrying a few thousand meters of tapes. Such tape-carrying cores are commonly known as a "pancakes" of tapes.

The pancakes usually have to be transported from the tape manufacturer to the tape packager where they are cut into tapes of suitable recording lengths, e.g. 60, 90 or 180 minutes, and mounted in standard cassette cartridge or reels. In the course of such transportations, several pancakes of tapes are always stacked together for packing and transportation efficiency. They are also likely to be handled by a variety of conveying equipment or devices. In many cases, the pancakes would have to travel long distances before they are finally cut and packed.

The recording and reproduction quality of the tapes depends on the quality of the recording coating which means that any significant scratches to the tapes would cause recording quality degradation and may even cause production loss at later production stages.

One form of damage which frequently occurs during transportation are mutual scratches between tapes due to relative jarring or jolting between adjacently stacked pancakes. Such relative movements are primarily due to the improper or imperfect interlocking between winding cores which have to carry a large diameter of tapes with a relatively small core diameter.

A typical winding core is usually an annular body having an external circumferential winding surface for carrying tapes. The axial thickness of the tape winding surface of a winding core is usually equal to the width of the type of tape which the core is designed to carry. The total internal axial or bore thickness of a winding core is however determined by the holding device of the processing machines on which it is to be mounted for processing. In most cases, the internal winding surface thickness needs to be adjusted to be the same as that of the holding device while its external surface thickness is equal to that of the tapes.

For example, standard tape widths for compact audio cassettes are 3.8 or 6.3 mm while standard NARTB cores have an internal bore thickness of 8.9 mm to adjust to the width of the winding surface of the processing machines. This difference between the bore and external winding surfaces thickness results in practical difficulties when a large number of identical cores are to be stacked together or packed together for transportation. Traditionally, cardboard or foam rings are inserted in the space between stacked pancakes to prevent relative slipping or deformation due to jarring or jolting during transportation.

U.S. Pat. No. 4,081,151 issued to Ender et. al. discloses an improved stackable winding core which is provided with an interlocking structure to allow several pancakes to be stacked together with a small or negligible space between adjacent pancakes so that bulky inserts between them are no longer required. However, such winding cores tend to be disengaged from mutual interlocking when subject to the minor shear or twisting forces which can be anticipated during various stages of handling.

SUMMARY OF THE INVENTION

According to the present invention, there is therefore provided an improved stackable winding core for carrying tapes comprising an inner rim, an outer rim, first and second core planes, and an axial aperture defined and surrounded by said inner rim, and having distributed along its said inner rim a plurality of driving-pin engagement means for engaging with a holding device of a processing machine, a plurality of clamping teeth wherein each said tooth comprises a first radially extending portion and a second axially extending portion, said second portion extending from a free end of said first portion, a plurality of retention teeth wherein each said retention tooth comprises a radially extending portion, and a plurality of retention gaps wherein each said retention gap is formed between a said retention tooth and a said clamping tooth and is adapted to receive said secondary portion of said clamping tooth.

Preferably, the winding core further comprises a plurality of lugs wherein each said lug comprises a protrusion means axially extending from a said core plane.

Preferably, the winding core further comprises a plurality of recesses adapted to receive said lugs and are distributed on said core planes.

Preferably, for a lug on said first core plane, there is provided a corresponding recess on said second core plane, and said recess is located at an angular displacement equal to the angular width of said first portion of said clamping teeth from said lug.

According to the present invention, there is therefore provided a winding core for flexible tapes comprising an inner rim, an outer rim, first and second core planes and an axial aperture surrounded by said inner rim, and having distributed along its said inner rim a plurality of driving-pin engagement means for engaging with a holding device of processing machine on which said core is intended to be loaded, and a plurality of clamping teeth wherein each said tooth comprises a first radially extending portion and a second axially extending portion, said second portion extending from the free end of said first portion and having a pre-determined angular width; and having distributed on said core planes a plurality of lugs wherein said lugs being protrusion means axially extending from said core planes, and a plurality of recesses adapted to receive said lugs.

Preferably for every lug on said first core plane, there is provided a corresponding recess on said second core plane, said recess being located at an angular displacement equal to the angular width of said first portion of said clamping teeth from said lug.

Preferably for a lug on said first core plane, there are provided two corresponding recesses on said second plane, each said recess being located at an angular displacement equal to the angular width of said first portion of said clamping teeth from said lug.

BRIEF DESCRIPTION OF THE DRAWINGS

The present invention will now be illustrated and explained in further details by way of examples and with reference to the accompanying drawings, in which.

DETAILED DESCRIPTION OF THE PREFERRED EMBODIMENTS

Figure 1:
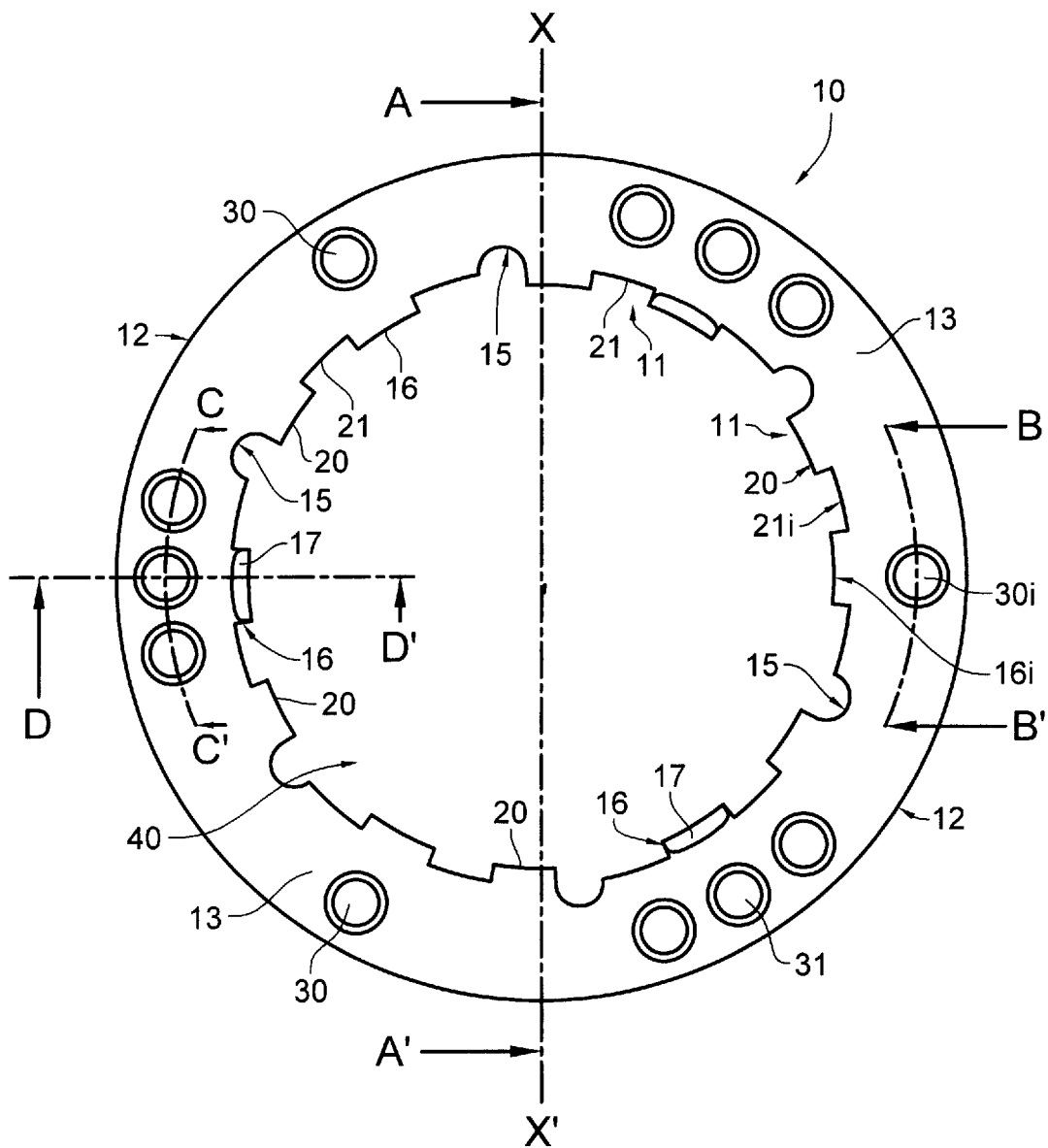
FIG. 1 is a plan view showing a first core plane of a preferred embodiment of the present invention.

The principle use of a winding core is for carrying a large length of pre-coated magnetic tapes on a relatively small winding core by winding the tapes on its external winding surface, thereby forming a pancake of tapes. Since a core needs to bear the weight of a large pancake of tapes which are many times heavier than the core itself, it is preferably formed by moulding from a hard, durable and highly non-deformable material such as nylon, ABS or polycarbonate to allow simple handling and multiple re-use.

A winding core for magnetic tapes usually comprises a substantially annular body having an axial aperture in the middle. It is generally characterised by the surfaces which are usually identified as: i) an inner rim which abuts the central aperture, ii) an outer rim which is designed to carry magnetic coated tapes, and iii) two planar surfaces, i.e. the first and second core planes which are normal to both rims.

The primary function of the outer rim of a winding cores is to carry tapes. To permit easy tape winding and un-winding by way of core revolution, the outer rim is usually substantially circular but a high order polygonal shape may of course be used as an alternative. The thickness, or axial depth, of the outer rim is usually designed to be substantially same as the width of the magnetic tapes being carried. This is partly to save material and partly because when several pancakes of tapes are stacked together, the thickness of the outer rim determines the gaps between tapes wound on adjacently stacked pancakes. Avoidance of gaps is important to minimise and tendency for pancake deformation during tape transportation or conveyance.

The inner rim of a winding core provides an interface between the magnetic tapes and the holding device of a processing machine on which a pancake is intended to be loaded. Its primary function is to engage a pancake with the holding device and its dimension must therefore be adjusted to be engageable by the holding device. A standard holding device is usually substantially cylindrical and the inner rim must therefore substantially conform thereto.

On the periphery of the holding device, there are usually provided a plurality of driving pins for engaging with a winding core and for maintaining revolutionary synchronisation between the holding device and the pancake. On the inner rim of the core there are therefore provided a corresponding number of complementarily shaped driving-pin engaging recess means.

Referring to the Figures where a preferred embodiment of the present invention is shown. The winding core comprises an annular body 10 having an inner rim 11, outer rim 12, first and second core planes, 13 & 14. It also defines an aperture 40 which is surrounded by the inner rim 11. Since both the inner and outer rims are substantially circular, the present winding core is reminiscent of a large-sized washer used in machinery constructions.

On the inner rim 11 of the core there are formed a plurality of driving-pin engagement recesses 15 which are complementarily shaped and distributed to engage with driving pins on a holding device. These recesses are usually evenly distributed along the circumference of the inner rim.

A plurality of clamping teeth 16 are formed on the inner rim 11. These clamping teeth 16 provide immediate contact between the winding core and the holding device. Each clamping tooth extends radially inwardly from the inner rim 11 towards the centre of the winding core. The free end of the clamping teeth 16 is arcuately shaped to conform to the exterior surface curvature of the holding device. Since the core holding device is usually cylindrical, it follows that the aggregate of all these arcuate surfaces together would approximately define the holding device periphery which is usually substantially circular.

At the free end of each clamping tooth 16 there is formed a secondary tooth portion 17 which protrudes normally from the core plane and extends along the axial direction. This secondary tooth 17 is a generally arcuate wall which is formed as an axial extension to the arcuate free end of the clamping tooth in order to provide an enlarged contact surface to adapt to the winding surface of the holding device.

For maximum symmetry about the median plane of the core, the clamping teeth are formed in diametrically opposite pairs in which each secondary tooth portion has an opposite axial extent. That is, each diametrically opposite secondary tooth portion extends normally from the opposite core planes. For symmetry about the core centre, these secondary teeth pairs are preferably distributed evenly along the perimeter of the inner rim.

It follows that when the total number of clamping teeth is even, these secondary teeth will extend alternately from the first and second core planes. When a plurality of identical pancakes are compactly stacked together, the secondary teeth portions will penetrate into the aperture space of the respective core which is stacked immediately adjacent to the core plane from which they extend.

In addition, there are further provided a plurality of radially extending retention teeth 20 each of which is located between a driving pin recess 15 and a clamping tooth 16. The retention teeth 20 comprises first and second free edges. The first free edge is formed directly adjacent to the driving pin recess and provides an radial extension to the driving-pin recess wall for securely engaging a driving pin during holding device revolution. The second free edge is located at an angular distance away from the driving-pin recess and towards a clamping tooth. The term angular distance in the present specification refers to the angular distance measured with reference to the centre point of the core.

This second free edge together with the free radial edge of the adjacent clamping tooth 16 define a retention gap 21 between them. This retention gap 21 is just wide enough to accommodate the secondary portion 17 of a clamping tooth when a clamping tooth from an adjacent core is axially inserted into the retention gap 21, probably leaving only a small clearance to limit rotational movements.

Figure 2:
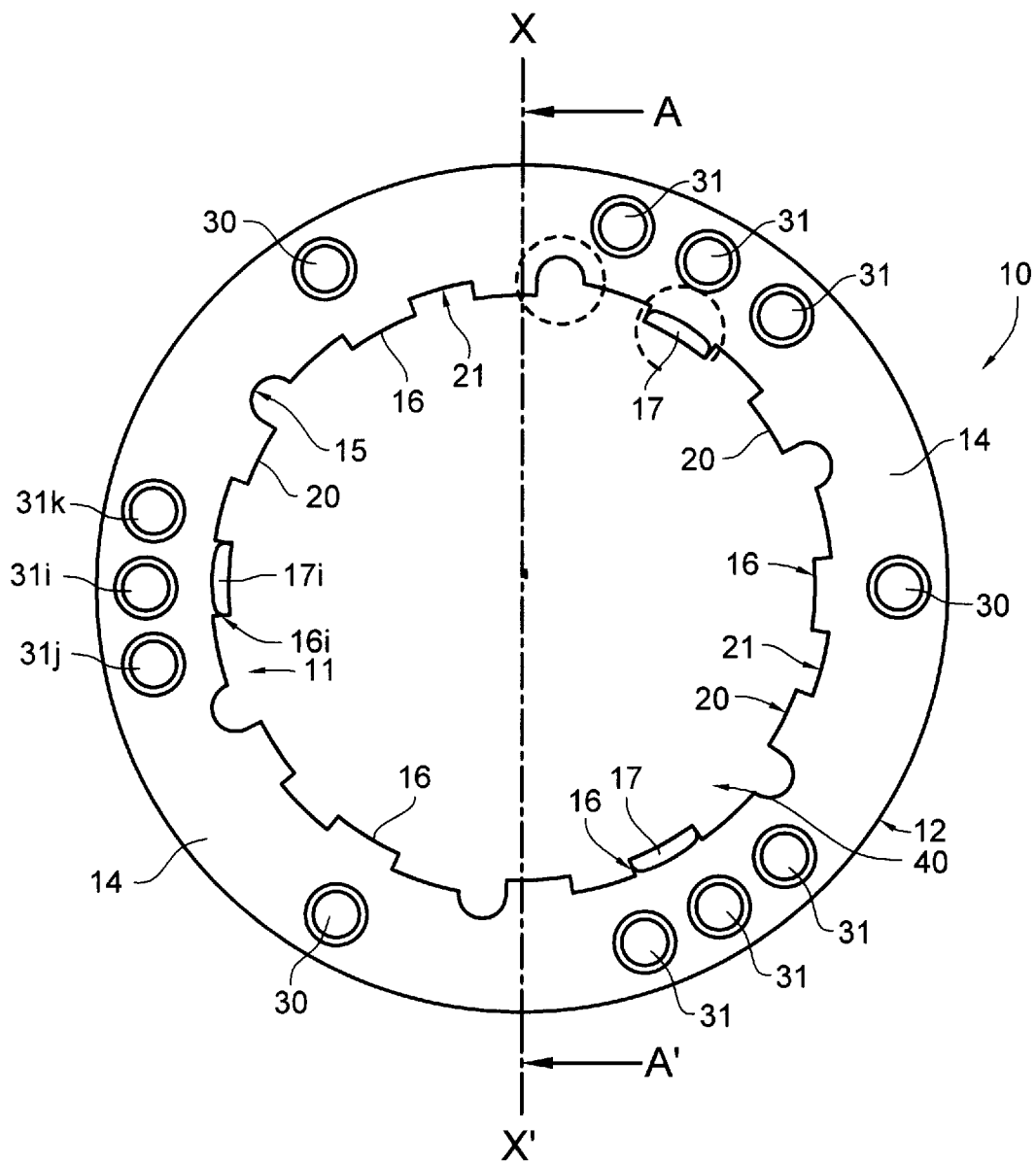
FIG. 2 is the rear view of FIG. 1 showing the second core plane of the winding core by turning the first core plane about the axis X–X'.
Figure 3:
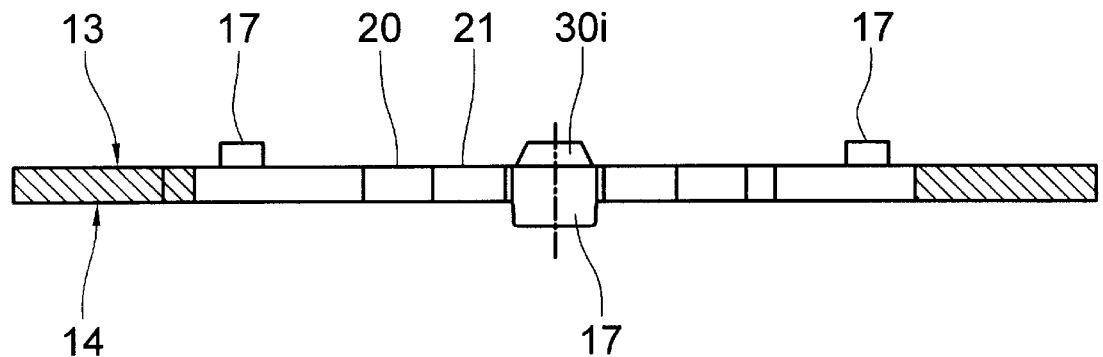
FIG. 3 is a sectional view of the winding core of FIG. 1 taken across the line A–A'.
Figure 4:
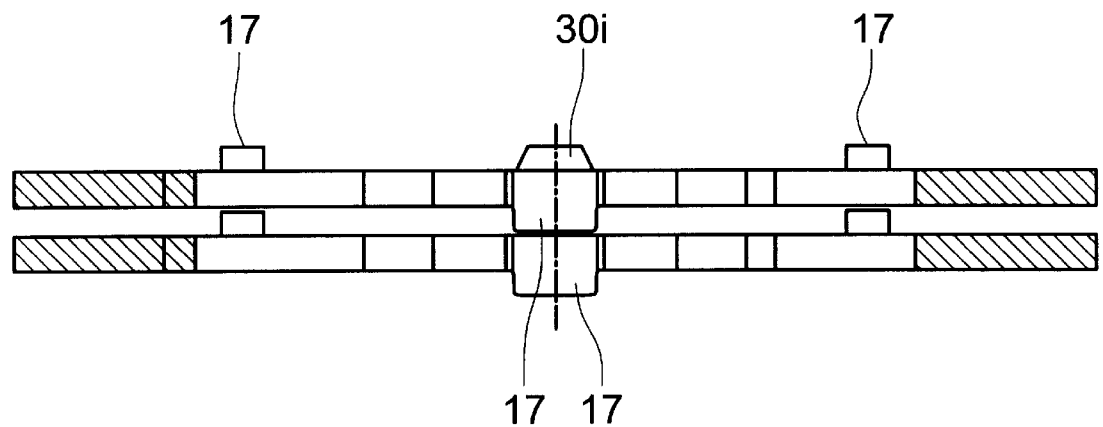
FIG. 4 is a sectional view showing two identical cores disposed adjacent to each other with same orientation and the parts exactly aligned.
Figure 5:
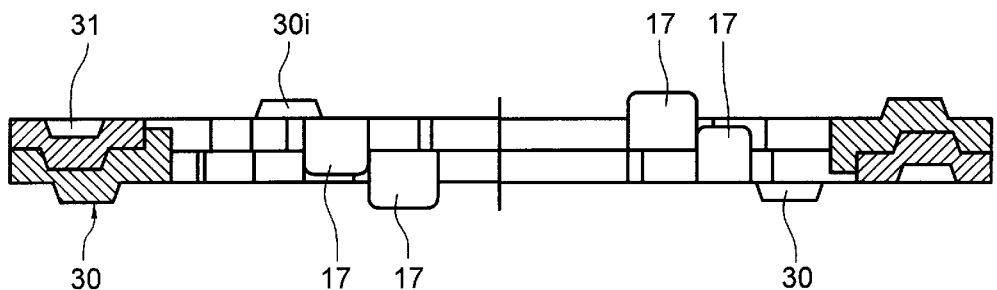
FIG. 5 is a sectional view showing two identical cores in compact stacking.
Figure 6A:
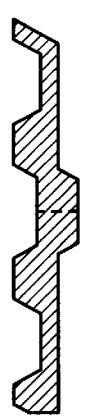
FIG. 6 shows the various sectional view taken across the lines, B–B', C–C' & D–D'.
Figure 6B:
Figure 6C:

On each core plane of the winding core there are provided a plurality of axially protruding lugs 30. Each lug 30 is made into the shape of an inverted tumbler or a truncated cone so that it can be totally received within a corresponding complementary recess 31. On the back core plane and at a position which is directly behind the lug there is formed an "image recess" which is also complementary to the lugs. When two adjacent identical cores are exactly aligned such that same core planes face the same direction with all other corresponding parts strictly aligned, it would be observed that a lug on a first core plane of a first core will be exactly aligned with an image recess on the second core plane of the second core, and vice versa. For example, the recess 31i in FIG. 2 is the image recess of the lug 30i in FIG. 1.

If two identical adjacent cores are to be stacked or coupled together with a minimum separating gap, an equal number of recess must be provided on the corresponding surface of the adjacent core. Otherwise, lugs which are not provided with corresponding receiving recesses will collide either with the core plane or other lugs on the corresponding plane. For example, if six lugs are provided on a core plane, at least six recesses must be correspondingly provided on the corresponding core plane of the adjacent core so that continual compact stacking is possible.

A lug-and-recess pair thus provides interlocking means between adjacent coupled cores to effectively reduce the risk of undesirable dislocation or transversal displacement due to relative shear or twists between adjacent cores which would otherwise damage tape coatings and consequently degrade recording quality.

If a winding core is to be freely stackable with either the first or second core planes of another identical adjacent core so that there is no orientational limitation, both lugs and cores would need to be present simultaneously on the same core plane. Such an arrangement would greatly enhance the coupling flexibility of the cores, thereby increasing its practical utility value.

This practical utility can further be enhanced if an equal number of plugs and recesses are evenly and alternately distributed along the circumferential surface on each side of the core plane so that there is a high degree of symmetry.

When two identical cores are adjacently placed such that same core planes face the same directions and corresponding lugs are exactly aligned, it would be expected that clamping teeth 16 from the adjacent core will step on the base of the corresponding clamping teeth and lugs will rest on the core planes, leaving a gap which is equal to the axial length of the secondary teeth between adjacent core planes.

In view of the above conflict, a lug 30i cannot be received by its image recess 31i. Instead a suitable receiving recess 31j is positioned at an angular distance away from the image recess. This angular distance is equal to the arcuate width, or more exactly the angular width of a clamping tooth 16. The effect of this is that when an adjacent core is rotated by an amount equal to this angular width, the secondary tooth 17i will steer clear of the corresponding clamping tooth 16i on the next core and then be received and trapped by the retention recess 21i which is formed by the free edges of a clamping tooth 16i and a retention tooth 20.

When clamping teeth 16 on adjacent cores are engaged by their corresponding retention recesses 21, the cores are then prevented from further relative rotational movement, thereby achieving mutual interlocking of the cores. At this instance, lugs mate with their receiving recesses, thereby providing extra interlocking.

In addition, a second recess 31k is located at a same angular distance from the image recess but to the other direction, i.e. away from the recess 31j. The function of this second recess 31k is to allow possible lug and recess engagement when the adjacent core is rotated to the other direction to steer clear of the corresponding clamping tooth.

The provision of an angular symmetrical recess pair about the image recess means that adjacent cores can be interlocked irrespective of the relative direction of rotation. Moreover, when adjacent cores are disengaged, this second recess means that they may be re-engaged at the second recess after having travelled only for a short distance, rather than having to travel a full distance before the next recess originally engaged by another lug is reached. This means a higher probability of re-engagement before other cores are disengaged and also reduced probability of mutual scratches.

Therefore, with the present invention, a plurality of adjacent winding core can be compactly stacked together with double interlocking to alleviate the possibility of dislocation during transportation. Even where dislocation occurs, the present invention also provide a fail-safe means for core re-engagement, thereby mitigating damages which might result from dislocations of the otherwise stacked cores.

Naturally, it would follow that a secondary portion on a clamping tooth can extend in both directions so that it can simultaneously penetrate the aperture spaces of both adjacent cores and provide double interlocking, further enhancing locking effectiveness.

Another important feature of this invention is that significant material saving is achieved by the design and selection of interlocking means, i.e. clamping teeth, lugs-and-recess pairs, when compared to other cores.

It should be noted that the core of the present specific embodiment has been designed to be loaded on a holding device having six driving pins. Therefore there are accordingly six driving pin recesses, together an equal number of clamping teeth, lugs and recesses. Half of these parts are distributed on each side of the core plane. The driving-pin recess, clamping teeth and the lugs are all evenly distributed and are therefore separated by 60 degrees.

The total axial extent or depth of the inner rim, as defined by the distance between the axial extremes, i.e. free ends, of the secondary teeth on each diametrically opposite pair, is usually equal to 8.9 mm since the holding devices of most tape processing machines are designed to adapt to this standard width. More particularly, each clamping tooth has an angular width of about 13 degrees and the lug-receiving recesses are therefore located at an angular distance of about 13 degrees from either direction of the image recess. Obviously, the dimension of the cores would have to be modified to adapt to holding devices of a different design.

I claim:

1. A winding core for flexible tapes comprising an inner rim, an outer rim, first and second core planes, and an axial aperture defined and surrounded by said inner rim, and having distributed along said inner rim:

a plurality of driving-pin engagement surfaces for engaging with a holding device of a processing machine, a plurality of clamping teeth wherein each tooth comprises a first radially extending portion and a second axially extending portion, said second portion extending from a free end of said first portion, a plurality of retention teeth wherein each retention tooth comprises a radially extending portion, a plurality of retention gaps wherein each retention gap is formed between a retention tooth and a clamping tooth and is adapted to receive said secondary portion of a clamping tooth, a plurality of lugs wherein each lug comprises a protrusion axially extending from said core plane, and a plurality of recesses distributed on said core planes, and adapted to receive said lugs, wherein for a lug on said first core plane, there is provided a corresponding recess on said second core plane, and said recess is located at an angular displacement, equal to the angular width of said first portion of said clamping teeth, from said lug.

2. A winding core for flexible tapes comprising an inner rim, an outer rim, first and second core planes, and an axial aperture defined and surrounded by said inner rim, and having distributed along said inner rim:

a plurality of driving-pin engagement surfaces for engaging with a holding device of a processing machine, a plurality of clamping teeth wherein each tooth comprises a first radially extending portion and a second axially extending portion, said second portion extending from a free end of said first portion, a plurality of retention teeth wherein each retention tooth comprises a radially extending portion, a plurality of retention gaps wherein each retention gap is formed between a retention tooth and a clamping tooth and is adapted to receive said secondary portion of a clamping tooth, a plurality of lugs wherein each lug comprises a protrusion axially extending from said core plane, and a plurality of recesses distributed on said core planes, and adapted to receive said lugs, wherein for a lug on said first core plane, there are provided two corresponding recesses on said second plane, each said recess being located at an angular displacement, equal to the angular width of said first portion of said clamping teeth, from said lug.

3. A winding core for flexible tapes comprising an inner rim, an outer rim, first and second core planes and an axial aperture surrounded by said inner rim, and having distributed along said inner rim:

a plurality of driving-pin engagement surfaces for engaging with a holding device of a processing machine on which said winding core is intended to be loaded, and a plurality of clamping teeth wherein each said tooth comprises a first radially extending portion and a second axially extending portion, said second portion extending from the free end of said first portion and having a pre-determined angular width; and having distributed on said core planes:

a plurality of lugs wherein said lugs comprise protrusions axially extending from said core planes, and a plurality of recesses adapted to receive said lugs, wherein for every lug on said first core plane, there is provided a corresponding recess on said second core plane, said recess being located at an angular displacement, equal to the angular width of said first portion of said clamping teeth, from said lug.

4. A winding core for flexible tapes comprising an inner rim, an outer rim, first and second core planes and an axial aperture surrounded by said inner rim, and having distributed along said inner rim:

a plurality of driving-pin engagement surfaces for engaging with a holding device of a processing machine on which said winding core is intended to be loaded, and a plurality of clamping teeth wherein each said tooth comprises a first radially extending portion and a second axially extending portion, said second portion extending from the free end of said first portion and having a pre-determined angular width; and having distributed on said core planes:

a plurality of lugs wherein said lugs comprise protrusions axially extending from said core planes and a plurality of recesses adapted to receive said lugs, wherein for a lug on said first core plane, there are provided two corresponding recesses on said second plane, each said recess being located at an angular displacement, equal to the angular width of said first portion of said clamping teeth, from said lug.

* * * * *